United States Patent
Nam et al.

(10) Patent No.: US 7,254,388 B2
(45) Date of Patent: Aug. 7, 2007

(54) SYSTEM FOR MS-ASSISTED LOCATION TRIGGER, AND SERVICE METHODS THEREOF

(75) Inventors: Kwang-Woo Nam, Cheongju (KR);
Kyoung-Wook Min, Daejeon (KR);
Seong-Ho Lee, Daejeon (KR); Jae-Ho Lee, Daejeon (KR); Jun-Wook Lee, Cheongju (KR)

(73) Assignee: Electronics and Telecommunications Research Institute (KR)

( * ) Notice: Subject to any disclaimer, the term of this patent is extended or adjusted under 35 U.S.C. 154(b) by 229 days.

(21) Appl. No.: 11/027,160

(22) Filed: Dec. 29, 2004

(65) Prior Publication Data

US 2006/0014531 A1    Jan. 19, 2006

(30) Foreign Application Priority Data

Jul. 13, 2004    (KR) .................... 10-2004-0054551

(51) Int. Cl.
*H04Q 7/20*    (2006.01)
*H04Q 7/38*    (2006.01)

(52) U.S. Cl. ............. 455/418; 455/456.1; 455/456.2; 455/456.3; 455/419; 455/420; 455/456.6; 455/422.1; 705/14; 379/114.01; 379/114.02; 379/114.12

(58) Field of Classification Search ............. 455/456.1, 455/456.2, 456.3, 456.4, 456.5, 456.6, 457, 455/404.1, 404.2, 445, 422.1, 403, 414.1, 455/414.2, 414.3, 414.4, 500, 517, 435.1, 455/435.2, 550.1, 412.1, 412.2, 41.1, 41.2, 455/426.1, 426.2, 11.1, 432.1, 432.2, 406, 455/407, 408; 705/14; 379/114.01, 114.02, 379/114.12
See application file for complete search history.

(56) References Cited

U.S. PATENT DOCUMENTS

| | | | |
|---|---|---|---|
| 2003/0114141 A1* | 6/2003 | Offer | 455/406 |
| 2003/0148771 A1* | 8/2003 | de Verteuil | 455/456 |
| 2004/0176103 A1* | 9/2004 | Trossen et al. | 455/456.3 |
| 2006/0001570 A1* | 1/2006 | Salas et al. | 342/357.17 |

FOREIGN PATENT DOCUMENTS

| | | |
|---|---|---|
| KR | 2001-0016601 A | 3/2001 |
| KR | 2001-0100324 | 11/2001 |
| KR | 2002-0055788 A | 7/2002 |
| KR | 2002-0076680 A | 10/2002 |
| KR | 2003-0068637 A | 8/2003 |
| KR | 2003-0072425 A | 9/2003 |
| KR | 10-2004-0016527 A | 2/2004 |

* cited by examiner

*Primary Examiner*—Keith Ferguson
(74) *Attorney, Agent, or Firm*—Blakely Sokoloff Taylor & Zafman

ABSTRACT

Disclosed is a location trigger system for a location-based service comprising a mobile station in which a LAT detecting the location trigger is embedded; an LBS platform transmitting location trigger assisted information on a location trigger area to the MS, and handling the location trigger in accordance with events invoked on the basis of the location trigger assisted information; a location agent setting the location trigger to obtain location-based information of the MS; and an LBS application connected to the LP, and receiving a customized LBS based on the location information in accordance with the location trigger.

27 Claims, 17 Drawing Sheets

SYSTEM FOR MS-ASSISTED LOCATION TRIGGER, AND SERVICE METHODS THEREOF

CROSS REFERENCE TO RELATED APPLICATION

This application claims priority to and the benefit of Korea Patent Application No. 10-2004-54551 filed on Jul. 13, 2004 in the Korean Intellectual Property Office, the entire content of which is incorporated herein by reference.

BACKGROUND OF THE INVENTION

1. Field of the Invention

The present invention relates to Location-Based Services, and more particularly, it relates to a system for a multi-level MS-assisted Location trigger and a service method thereof.

2. Description of the Related Art

Location-Based Services (LBS) utilize a geographical location of a mobile station (MS) and provide location-specific services. There are hybrid technologies to obtain information based on a current location of a networked MS (or its user), and herein, a Global Positioning System (GPS) equipped MS is required to use the LBS.

Such an LBS utilizes a geographic location of an MS (or its user) in various marketing fields including a theater, a shopping mall, or a restaurant, using a cellular phone or a GPS. The LBS may provide more accurate information, and further it may be applied to networked fields and/or be combined with various positioning technologies including a Geographic Information System (GIS) and the GPS.

The LBS includes mobile station, trigger event, emergency call, public zone, point meeting, and location-sensitive billing services, and so on.

In particular, the mobile station service provides a user with geographical information, vicinity of a pre-specified area, traffic information, tourism information, and a friend finding service, etc., based on a current location of the MS (or its user). As examples of the LBS, SK Telecom provides their Mobile Zone service, and KTF provides information on traffic. In addition, the trigger service enables tracking of an MS (or its user) or a tracking-device-equipped subject in real-time by receiving a current location of the MS or the current location of the subject from an LBS server, and various types of services can be hybridized therefrom. The emergency call service provides prompt location identification in cooperation with the 911 Emergency or a criminal investigation department (i.e. Enhanced-911 in the United States). The public zone service reports entrance/exit from a restricted area of the MS by a short message service (SMS) or an e-mail, and provides various services in cooperation with a CRM server. The point meeting service provides on-line chatting and off-line meeting with another MS (or its user) located in the vicinity through a blind date service and wireless Internet. Further, a location-sensitive billing service provides an MS (or its user) with a selective payment method depending on a current location of the MS (i.e., home, work, shopping zone, etc.).

Meanwhile, "An apparatus for informing mobile communication terminal of its position and method thereof" disclosed in Korea Patent No. 2001-16733 filed on Mar. 30, 2001, provides a detecting method of a location trigger in a visitor location register (VLR).

In this prior invention, a particular area is pre-specified and a subscriber who enters the pre-specified area is provided with services based on the location. The purpose of the invention is to inform a new subscriber of their entering/exiting of the pre-specified area. The apparatus for informing a mobile communication terminal of its position and the method thereof provides a subscriber with information on whether the subscriber enters a pre-specified location where associated services based on the location are available, thereby utilizing location-based services in various ways.

"Message method for destination arrival of terminal" disclosed in Korean Patent No. 2002-48735 filed on Aug. 17, 2004, provides a method of messaging destination arrival to a mobile terminal (or its user), wherein the mobile terminal includes a mobile telephone or a GPS.

The message method for destination arrival of the mobile terminal according to the invention provides a method of visually or aurally informing a user of arrival at the destination when the user falls asleep or reads a book while traveling by public transport.

Hereinafter, a method for supporting a location trigger function in a conventional location-based service (LBS) will be described, with reference to FIG. 1 to FIG. 3.

Extending the functionality of a Mobile Services Switching Center (MSC)/Home Location Register (HLR) is one of the methods for supporting the location trigger in the conventional LBS.

FIG. 1 shows an exemplary embodiment of configuring the location trigger by extending the functionality of the MSC/HLR, and exemplarily describes implementation of the location trigger by extending the functionalities of an HLR and a Visitor Location Register (VLR), which is carried out by SK Telecom (a mobile telecommunication provider in South Korea).

As shown therein, the most general method of the location trigger in the conventional LBS is directly modifying the HLR and VLR of the base station in a mobile network for supporting a roaming service.

A process sequence of setting up the location trigger is as follows.

① An operator of a location trigger inputs information (i.e., base station information) through an information input/output device 161 of a location information service system 160, and stores the inputted information in a user-trigger area database 162. The user-trigger area database 162 informs of regional data update to a location change controller 163.

② The location change controller 163 transmits the updated trigger information (base station) to an HLR 150, and the HLR 150 stores the updated trigger information and transmits the information to MSCs 130a and 130b.

③ The MSCs 130a and 130b mark a particular field (i.e., a particular location-based service field) among stored location information as '1' using the transmitted trigger base station information.

Further, an operation sequence of the location trigger is as follows. ① Changes of base stations 121a, 121b, and 121c or a current location of an MS 110 are updated to VLRs 140a and 140b in the MSCs 130a and 130b managing base stations, and the MSCs detect the changes.

② Herein, the MSCs 130a and 130b determine whether the new location is within a pre-specified area where the particular location-based service field value is set, and information related to the new location of the MS 110 is transmitted to the location change controller 163 through the HLR 150 when the new location is within the pre-specified area.

③ The location change controller 163 searches the user-trigger area data base 162 using the information on the MS 110 to check whether the MS 110 is registered with particular location-based services, and whether the MS meets pre-defined trigger criteria. In the case that the MS 110 satisfies both conditions, the MS information is provided to a location trigger user.

The foregoing method has advantages of implementing the location trigger regardless of type of MS by extending the functionality of the MSC and HLR, but at the same time causes direct modification of exchange software (i.e., MSC) and communication interruption when the trigger location function is overly activated, thereby inducing the exchange to be overloaded.

On the other hand, a polling server can be employed to support the location trigger function of the conventional LBS.

FIG. 2 illustrates a configuration of the location trigger employing a conventional pooling server.

The location trigger can be implemented by constantly and periodically monitoring a current location of an MS 210 using a polling server 263 periodically requesting the current location of the MS until satisfying pre-specified conditions in a user-trigger location database 262.

Meanwhile, a polling method using a mobile positioning center (MPC) server also can be employed to support the location trigger function of the conventional location-based services.

FIG. 3 shows a method of configuring a location trigger employing a conventional Mobile Positioning Center (MPC) server.

Recent network communication systems employ a Position Determination Entity (PDE) and a Mobile Positioning Center (MPC) in compliance with an increasing number of Assisted-GPS equipped MS users and telecommunication standardization carried out by the 3GPP. Herein, the PDE is a system containing an algorithm to position the A-GPS equipped MS (i.e., MSM5xxxx developed by Qualcomm), and the MPC is an integrated gateway system providing location-based information related to external wireless Internet services.

However, there are problems to be solved in the foregoing conventional technologies. The MSC performs a main role in the communication network and is implemented by directly modifying base station equipment, such as an HLR and a VLR supporting an MS roaming service. Further, direct modification of exchange software (herein, the MSC) is also required, and communication interruption occurs when trigger location function is overly activated, thereby inducing the exchange to be overloaded.

SUMMARY OF THE INVENTION

It is an advantage of the present invention to provide an MS-Assisted location trigger system and a service method thereof by having a location assistant embedded in an MS to separately process location trigger detection from the MS, thereby setting various user customized services without causing an overload in base station equipment (i.e., HLR).

Another advantage of the present invention is to provide a multi-level MS-Assisted location trigger system and a service method thereof enabling a location trigger to be available in a broad area (i.e., Cell) as well as in a relatively small area.

In one aspect of the present invention, a location trigger system for a location-based service (LBS) comprising a mobile station (MS); an LBS platform (LP); a location agent (LA); and an LBS application (LBSA). In the MS, a location assistant (LAT) is embedded, and the LAT detects the location trigger. The LP transmits location trigger assisted information on a location trigger area to the MS, and processes the location trigger in accordance with events invoked on the basis of the location trigger assisted information. The LA sets the location trigger to obtain location-based information of the MS. The LBSA is connected to the LP, and receives a customized LBS based on the location information in accordance with the location trigger. The location trigger is distribution-processed by the MS and the LP.

The location trigger system further comprises an area database (DB). The area DB stores location trigger assisted information of the location trigger area.

The location trigger assisted information on the location trigger area contains at least more than one element of a group including a base station Cell-ID, a repeater ID, a service antenna ID, a MAC address of a wireless LAN, and a Bluetooth ID.

The LP comprises a plurality of networked communication apparatuses for access to obtaining location-based information of the MS.

The plurality of communication apparatuses comprises a Mobile Positioning Center (MPC), a Home Location Resister (HLR)/Mobile Switching Center (MSC)/Visitor Location Resister (VLR), and a Position Determination Entity (PDE).

The LA and LBSA co-exist with the MS on a network, or the LA and LBSA, and the MS, are separately provided thereon.

The location trigger system further comprises a location server installed to the LP, and obtains the location trigger and a simplified location of the MS.

The location server comprises a location trigger access application, a location trigger, a location trigger analyzer, a trigger processor, a location trigger event processor, and an executor. The location trigger access application accesses a location trigger inputted from a location agent or a trigger operator tool through the LP. The location trigger analyzer analyzes the location trigger, and divides a complex location trigger into a multi-level location trigger. The trigger processor directly accesses a terminal to invoke a trigger, and detects associated events; a location trigger event processor monitors events from the trigger processor, compares the events to a location trigger DB, and detects an associated trigger; and an executor executes the triggered events.

The trigger processor comprises simple location trigger (LT), time trigger LT, MS-Assisted LT, and MS-Based LT processors.

In another aspect of the present, a location trigger method for a location-based service (LBS) is provided. In the method, a) a location agent (LA) sets a location trigger; b) an LBS platform (LP) transmits initial information on the location trigger to a mobile station (MS); c) the MS in which the LA is embedded detects the location trigger; d) the MS transmits information on events invoked based on the location trigger to the LP; and e) the LP processes the location trigger referring to the event information.

The location trigger method further comprises providing an LBS application (LBSA) with a location-based service in accordance with the location trigger processed by the LP.

In b), the LP detects a Cell-ID in an area DB and transmits an associated Cell-ID to the MS.

The location trigger method further comprises obtaining a radio signal including the MS Cell-ID, the repeater ID, the service antenna ID, and the MAC address of a wireless LAN, and invokes a trigger event using a device covering a relatively smaller area when a device covering a relatively bigger area satisfactorily processes a trigger event.

In the location trigger method, the location trigger sets a particular building or an area within a particular cell; the LAT embedded in the MS detects whether the MS enters the particular cell through a Cell-ID level location trigger; and an A-GPS is turned on to detect a more precise location trigger when the MS enters the particular cell.

In the method, the LAT and the LP use a plurality of messages to process the location trigger.

In the method, the plurality of messages comprise an LT setting message (LT-SET), an LT initialization message (LT_INIT), an LT event message (LT_EVENT), and an LT action message (LT_ACTION).

In the method, the LT processes a simple event related to entering/exiting of the MS, and the LP processes a complex event independently performing associated actions.

In the method, the MS is an MS-based terminal capable of independent performance of the complex event and the associated actions.

In c) of the method, the LAT-embedded MS detects a Cell-ID level location trigger. Further, in the method, an attending school and company alerting service is provided depending on a detection result.

In c) of the method, an A-GPS is turned on to process a more specific location trigger when the A-GPS embedded MS enters an area where a Cell-ID is pre-specified.

In b) of the method, the LP searches a particular area DB and transmits associated Cell-ID information to the MS.

In the method, f) an entering and outing alerting service provides an alert message or processes a particular process when the MS leaves the particular area, through the location trigger process.

In another aspect of the present invention, a location-based service (LBS) service method using a location trigger is provided. In the method, a) a location agent (LA) sets a location trigger; b)) an LBS platform (LP) searches a particular area DB and transmits a repeater ID or a service antenna ID to an MS; c) an LAT embedded in the MS detects a location trigger; d) the MS transmits information on a repeater ID or a service antenna ID obtained in consequence of the location trigger to the LP; and e) the LP processes the location trigger using the transmitted information and transmits an associated short message service (SMS) to the MS.

In e), a regional information alerting service is provided by using a repeater ID or a service antenna ID.

In another aspect of the present invention, a location-based service (LBS) method using a location trigger is provided. In the method, a) a location agent (LA) registers a mobile-telephone charge discount area; b) a user registers a particular mobile-telephone charge discount area with the LA; c) an LBS platform (LP) transmits information on a Cell-ID in a particular trigger location to the LA; d) a mobile-telephone charge discount area flag is set when an LAT embedded MS enters the particular mobile-telephone charge discount area; e) the MS transmitting event information is invoked in accordance with the mobile-telephone charge discount area flag to the LP; and f) the LP transmitting an SMS is associated with events invoked based on the mobile-telephone charge discount area flag to the MS.

In the method, the LBS is a location-sensitive mobile-telephone charge discount service using the LAT of the MS and the flag.

In the method, the LBS is a location-sensitive mobile-telephone charge discount service for generating an SMS caused by event information and billing the MS when the MS enters a mobile-telephone charge discount area.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
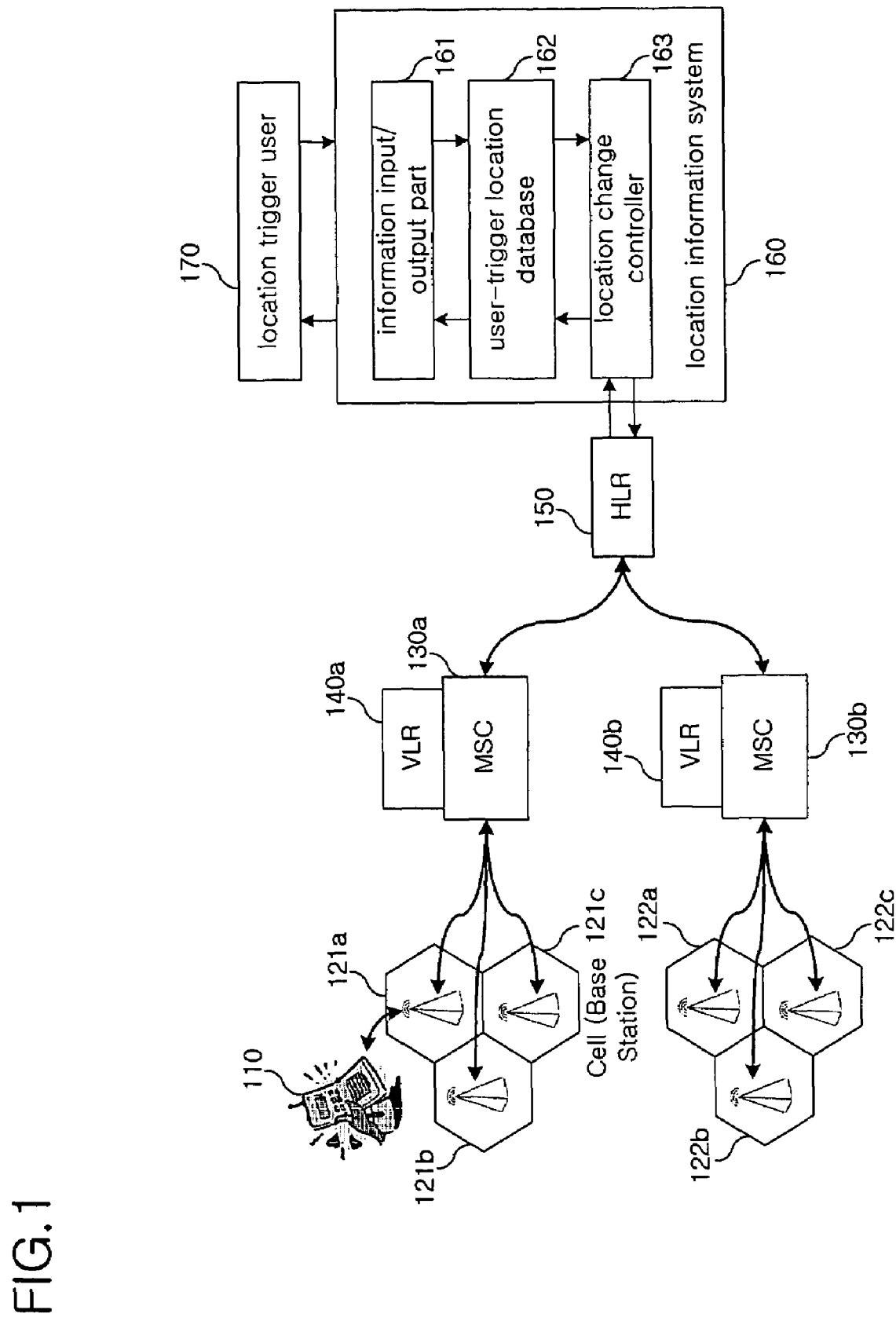
FIG. 1 illustrates a method of configuring a location trigger by extending the functionality of a conventional MSC/HLR.
Figure 2:
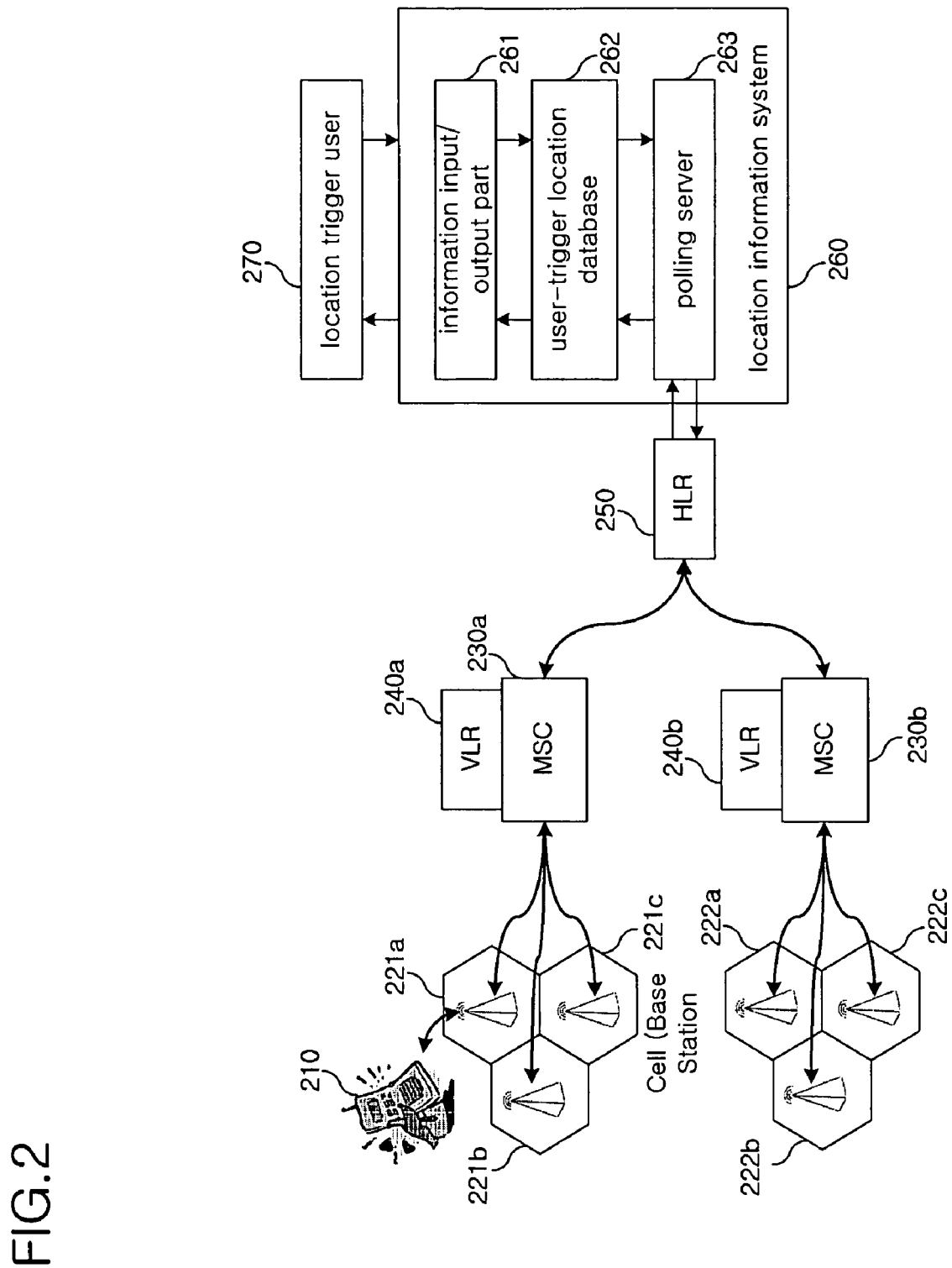
FIG. 2 illustrates a configuration method of a location trigger employing a conventional polling server.
Figure 3:
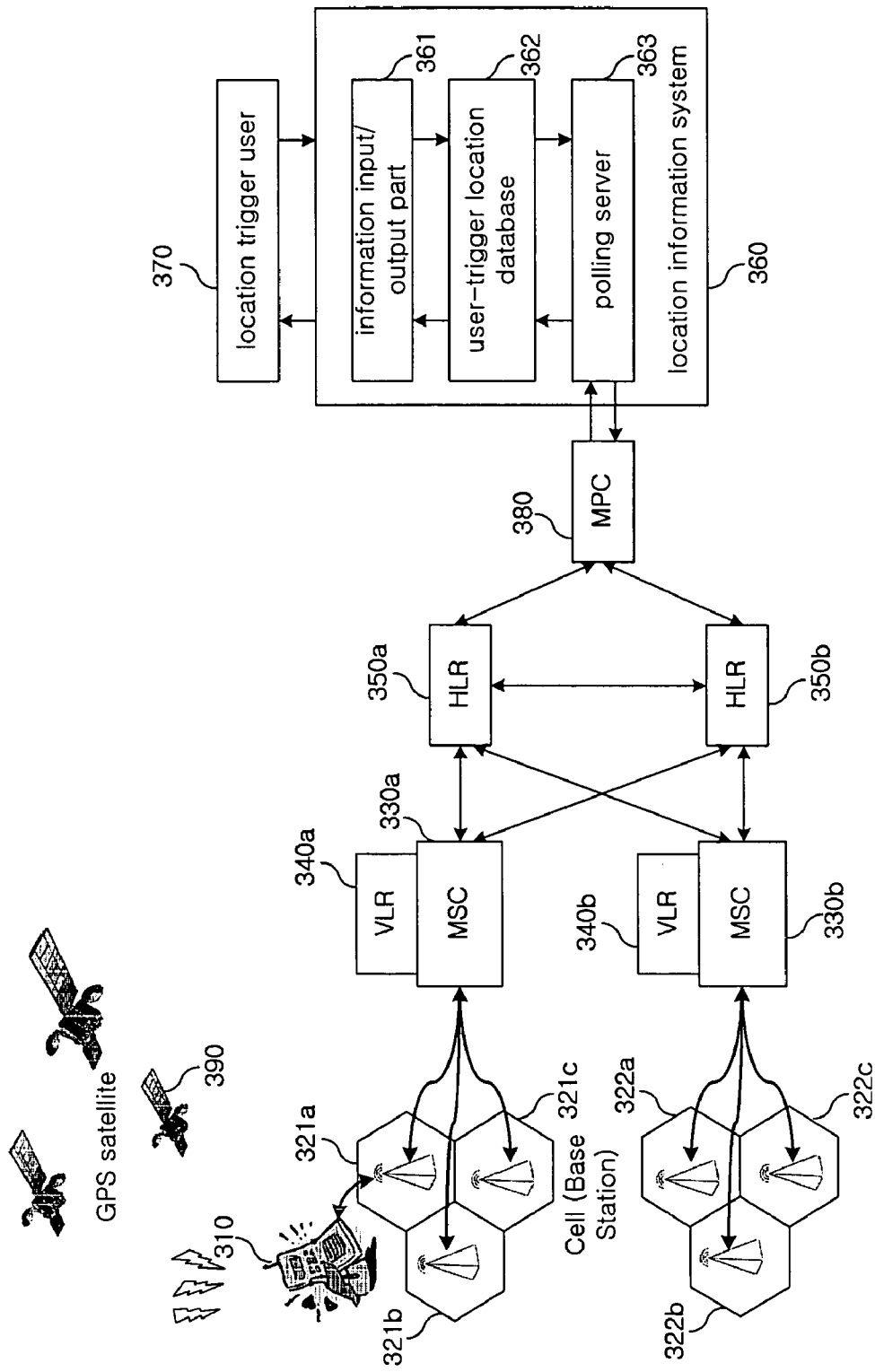
FIG. 3 illustrates a configuration method of a location trigger employing a conventional Mobile Positioning Center (MPC) server.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals. Throughout this specification, the word "mobile station (MS)" refers to a mobile network-enabled device and/or its user.

Hereinafter, an MS-assist location trigger system and service method thereof will be described in detail with reference to the accompanying drawings.

A location trigger monitors a current location of an MS in a communication network, and notifies the MS of entering in, being in, or outing from a pre-specified area, and provides user-customized services using a short message service (SMS).

Exemplary embodiments of the present invention describe an MS-based or MS-assisted system configuration and a method of the same to support a location trigger function, which is a main function in the LBS. According to the embodiments of the present invention, trigger assisted information including a Cell-ID and regional information on the trigger specified area is transmitted to the MS, and a location trigger function is processed by associated events invoked based on the trigger assist information.

Figure 4:
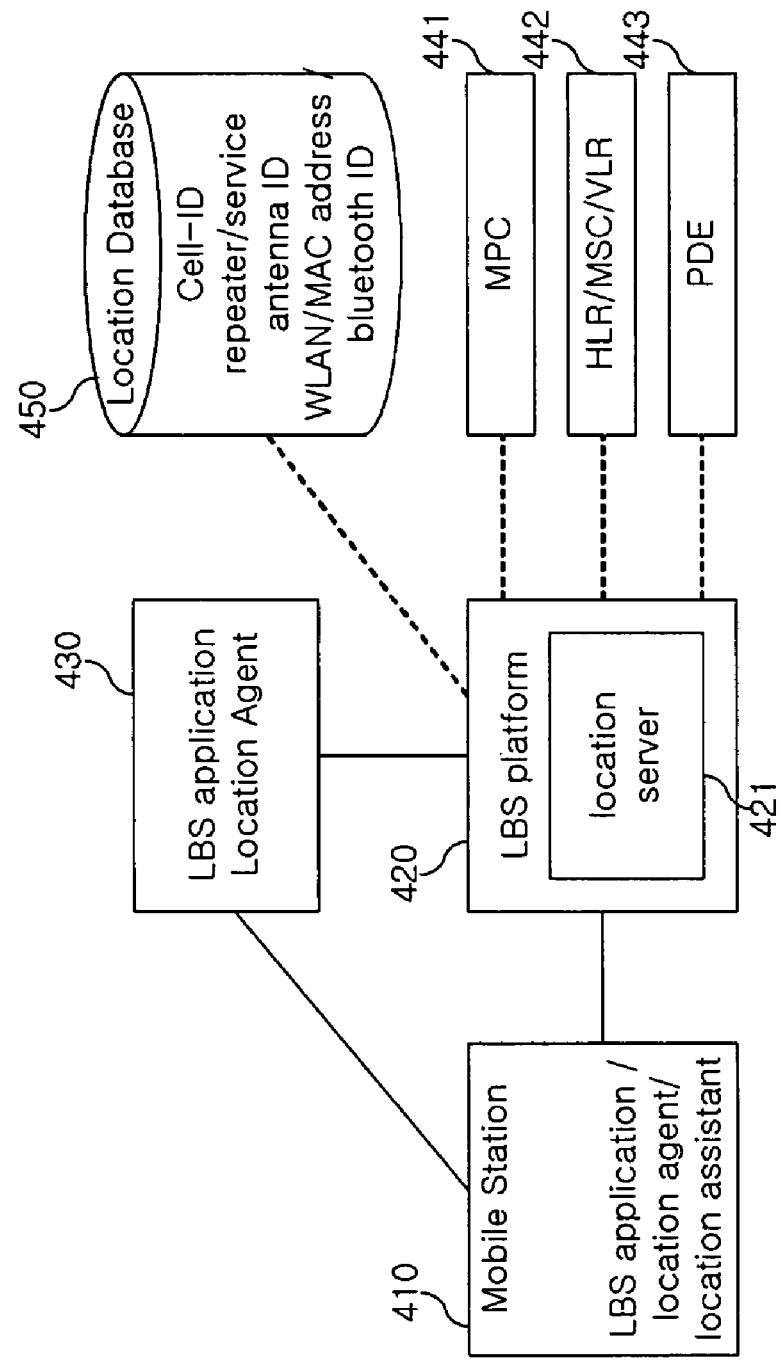
FIG. 4 shows an MS-Assisted location trigger system configuration according to an embodiment of the present invention.

FIG. 4 shows a configuration of an MS-assisted location trigger system according to an embodiment of the present invention. It illustrates a structure for an MS-based or MS-assisted location trigger.

Referring to FIG. 4, the MS-assisted location trigger system includes an MS 410, an LBS platform (LP) 420, an LBS application (LBSA) 430, an HSL/MSCNLR 442, a PDE 443, and an Area Database (DB) 450. Herein, the reference numeral 430 represents the LBSA or a location agent (LA) which may be provided on a network or installed in the MS 410, but is not restricted thereto.

The MS 410 may embed the LBSA, the location agent (LA), and the location assistant (LAT). Herein, the LA represents a service access point used to obtain location information, and the LAT represents software for actual location trigger detection. Further, the LBSA represents an application of the LBS using the location trigger function.

The LP 420 represents a software platform including a user management system and the like, which is necessary to implement the LBSA, and embeds a location server (LS) 421. Herein, the LS 421 is a kind of software performing the location trigger and obtaining an approximate location.

In addition, the MCP 441, the HLR/MSCNLR 442, and the PDE 443 are communication equipment forming a network that the LP accesses to obtaining location information.

Configurational and operational aspects of the MS-assisted trigger location system in FIG. 4 will now be described in detail, referring to FIGS. 5 to 10.

Figure 5:
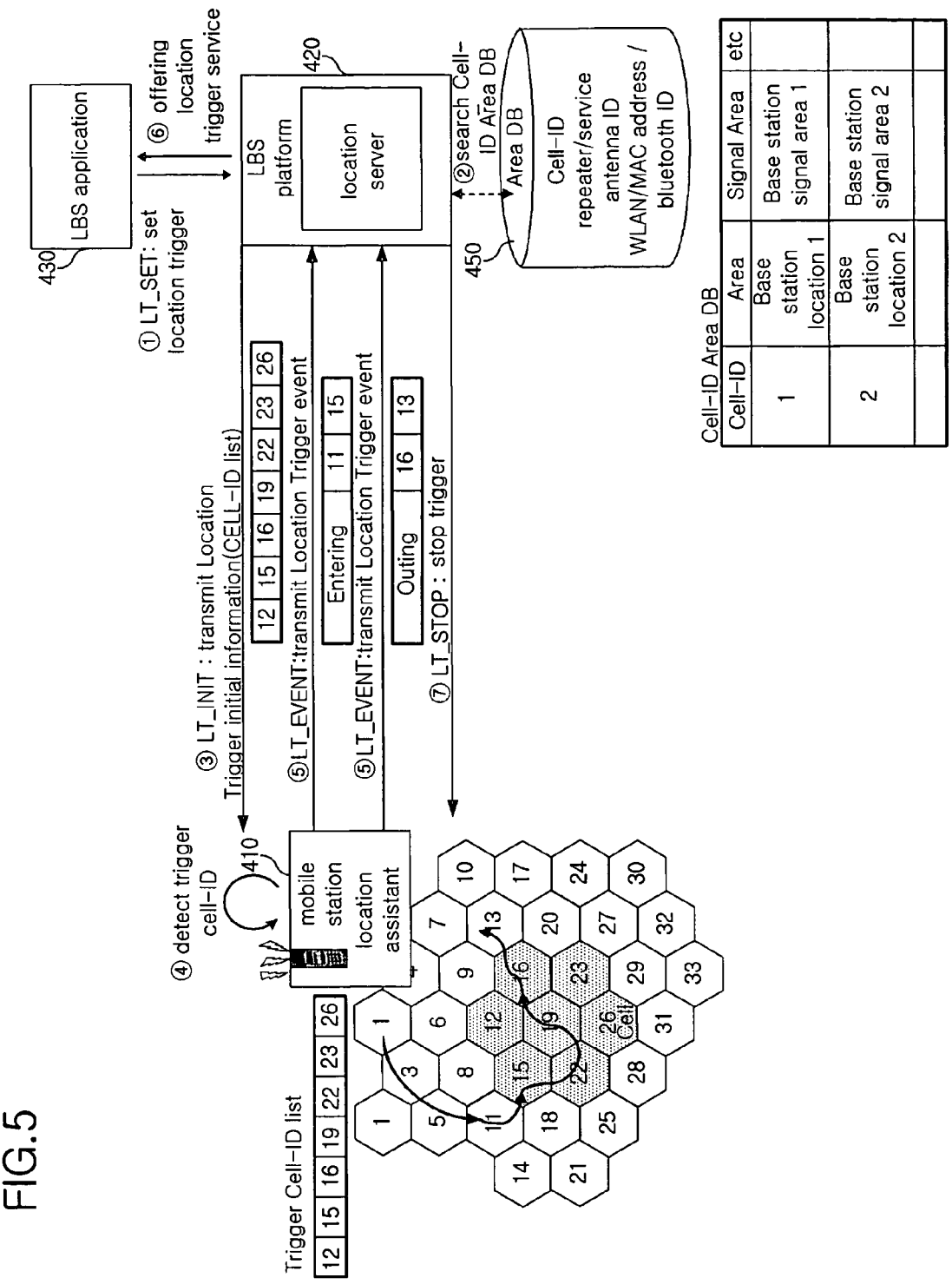
FIG. 5 illustrates a trigger processing structure and an operational flow of a location trigger using an MS location assistant (LAT) according to an embodiment of the present invention.

FIG. 5 illustrates an operational process of the location trigger and a structure thereof employing the LA of the MS according to the embodiment of the present invention.

With reference to FIG. 4 and FIG. 5, an operational sequence of the location trigger employing the LA of the MS is explained as follows.

The LA is embedded in the MS 410, and the LP 420 and the MS 410 separately process the location trigger detection using the LA, thereby enabling a user customized location trigger without adding extra base station equipment such as an HLR.

For instance, the MS 410 continuously receives signals from the base station to maintain mobility. Thus, when the location trigger is set as shown in FIG. 5, the LP 420 searches a Cell-ID DB 450 in the base station and transmits a Cell-ID associated with a pre-specified area to the MS 410, and the MS 410 monitors whether the MS enters the pre-specified area and transmits a corresponding trigger event to the LP to invoke the location trigger.

Herein, an MS receives a signal from a base station to identify locations, but a repeater ID and a service antenna ID can also be included in a signal as a location identifier since recent technology enables sending of a repeater signal together with a repeater ID or a service antenna ID. (i.e., RepeaterOne developed by Qualcomm).

Further, development of an A-GPS kit, a wireless LAN card, or a blue tooth keyboard embedded cellular phone enables MS-based location detection within indoor or particular areas.

A protocol of the location trigger according to the embodiment of the present invention will be described hereinafter.

Parameters of the location trigger include LT_Positioning, LT_Time, LT_Area, LT_Event_Operator, and LT_Report_Mode.

The LT_Positioning specifies a method for location detection referring to a Cell-ID, a repeater-ID, an embedded-GPS, an external-GPS, a wireless LAN, a Bluetooth ID, an MS-Assisted GPS, an MS-Based GPS, and a Standalone GPS.

The LT_Time is a time unit for a location trigger, and includes PERIOD, INSTANT, DURATION, and EVERY. For example, the EVERY represents every one hour, and the PERIOD represents every 500 seconds.

The LT_Area geometrically specifies a basic area for the location trigger, and includes LT_Geometry and LT_GeometryID. The LT_Geometry includes a point, a linestring, and a polygon, and the LT_GeometryID includes a Cell-ID, a repeater-ID, a MAC-ID, an RF-ID, an area-ID, an IP-ID, and an IPV6-ID.

The LT_Event_Operator represents a basic event invoked in formats of Entering(LISTOF(LT_Area)), Outing(LISTOF (LT_Area)), Meeting(LISTOF(LT_Area)), Crossing (LISTOF(LT_Area)), and AllChanges in consequence to the location trigger. All of these formats represent entering, outing, meeting, crossing, and all changing within each of location trigger specified areas.

The LT_Report_Mode is used when a location trigger event is invoked, and it reports the location trigger event to the LP in formats of Nothing, Triggered, Evented, and LT_Time.

Meanwhile, explanations of location trigger operation messages shown in FIG. 5 are as follows.

LT_SET is a message sent to the LP to allow the LA to set the location trigger, in formats of a trigger-ID, an object list, a location event, a performance during the trigger, and lifetime. For example, the message is LT_SET("001", <MSID(016333333)>, <ENTERING(<Cell-ID(3412), Cell-ID(3413)>)>, Push_SMS(<MSID(016222222), "John attends school"), PERIOD(20040401, 20040430)). In this message, "001" is a trigger ID, and MSID(016333333) is a subject list. Herein, 01633333333 represents a cellular phone number. ENTERING(<Cell-ID(3412), Cell-ID(3413)>is a location list representing that the MS leaves BS Cell-ID 3412 and enters BS Cell-ID 3413. Push_SMS (<MSID(016222222), "John attends school") is a short message service (SMS) sent to a cellular phone 016222222. In addition, PERIOD(20040401, 20040430) represents Life-Time of the event.

The LT_INIT is a message that the LP sends to the LAT to set the location trigger in formats of a trigger-ID, a location event list, a trigger report mode, a consequent event invoked by the trigger, and lifetime. For example, the LT_INIT message is LT_INIT("00101", <ENTERING<Cell-IDO3412), Cell-ID(3413)>)>, Evented, null, null). In this case, "00101" represents a trigger-ID, <ENTERING<Cell-IDO3412), Cell-ID(3413)>)>represents a location event list, and Evented represents a trigger report mode. The consequent event invoked by the trigger and the Lifetime are set to be null in this exemplary message.

Herein, the consequent event invoked by the trigger is a kind of a to-do list that the LAT performs when the trigger event occurs. The to-do list includes sending the SMS or a message to the LP-embedded MS. In detail, the LAT 15 processes a WakeUp-Trigger(Trigger ID) and a Sleep-Trigger(Trigger ID), wherein the WakeUp-Trigger(Trigger ID) activates a trigger event in the sleep mode, and the Sleep-Trigger(Trigger ID) deactivates a trigger event in the activating mode.

The LT_EVENT is a message that an event or the LT sends to the LP, in a format of LT_EVENT (a trigger ID, a positioning method, an invoked event, assisted information). For example, when the message is LT_EVENT("00101", Cell-ID, Entering(<Cell-ID(3412)>), "From Cell-ID(3411)"), "00101" is a trigger ID, and the Cell-ID is an identifier of a particular location. Entering(<Cell-ID(3412)>) is an event invoked when the MS enters Cell-ID 3412, and "From Cell-ID(3411)" is the assisted information informing that the MS leaves Cell-ID 3411.

The LT_ACTION is a message including a series of actions in consequence to the trigger event, and is sent to the LBSA by the LP or the LAT. For example, an Invoke_Popup_Window(IPADDRESS(129, 3, 4, 5) "John attends school") message represents a series of actions required to display the message "John attends school" on a popup window of the MS. Herein, an IP address of the MS invoking the trigger event is 129. 3. 4. 5.

The LT_ACTIVATION is a request message to stop a trigger event in the activation mode between the LP, LA, and LAT, in a format of LT_ACTIVATION(Trigger-ID, Mode). Herein, the Mode includes START activating the trigger event, REMOVE permanently removing the trigger event, and SLEEP temporarily halting the trigger event.

Referring back to FIG. 5, a process structure and an operational flow of Is the location trigger using the LAT of the MS according to an embodiment of the present invention will be described hereinafter.

① The LA 430 sends an LT_SET to the LP 420 to set a location trigger, and ② the LP 420 searches a Cell-ID list in the Area DB 450. Herein, Cell-ID Area DB in the Area DB 450 contains base station locations and base station signal areas corresponding to each Cell.

③ The LP 420 sends an LT_INIT to the LAT of the MS 410 so as to transmit initial information on the location trigger, including a trigger Cell-ID list. Herein, Cell-IDs in the list are respectively 12, 15, 16, 19, 22, 23, and 26 as shown in FIG. 5. ④ The LAT of the MS 410 checks the Cell-IDs.

⑤ The LAT of the MS 410 sends an LT_EVENT to the LP 420 once a location trigger event starts. For example, the MS 410 is entering Cell-ID 15 from Cell-ID 11 or leaving Cell-ID 16 to enter Cell-ID 13. ⑥ The LP 420 provides the LA 430 with a corresponding location trigger service in accordance to the LT_EVENT, and ⑦ the LP 420 sends an LT_STOP to the LAT of the MS 410 to stop the trigger event.

The foregoing location trigger operations also cover operational aspects shown in FIG. 5, FIG. 9, FIG. 10, and FIG. 12 to FIG. 16.

Figure 6:
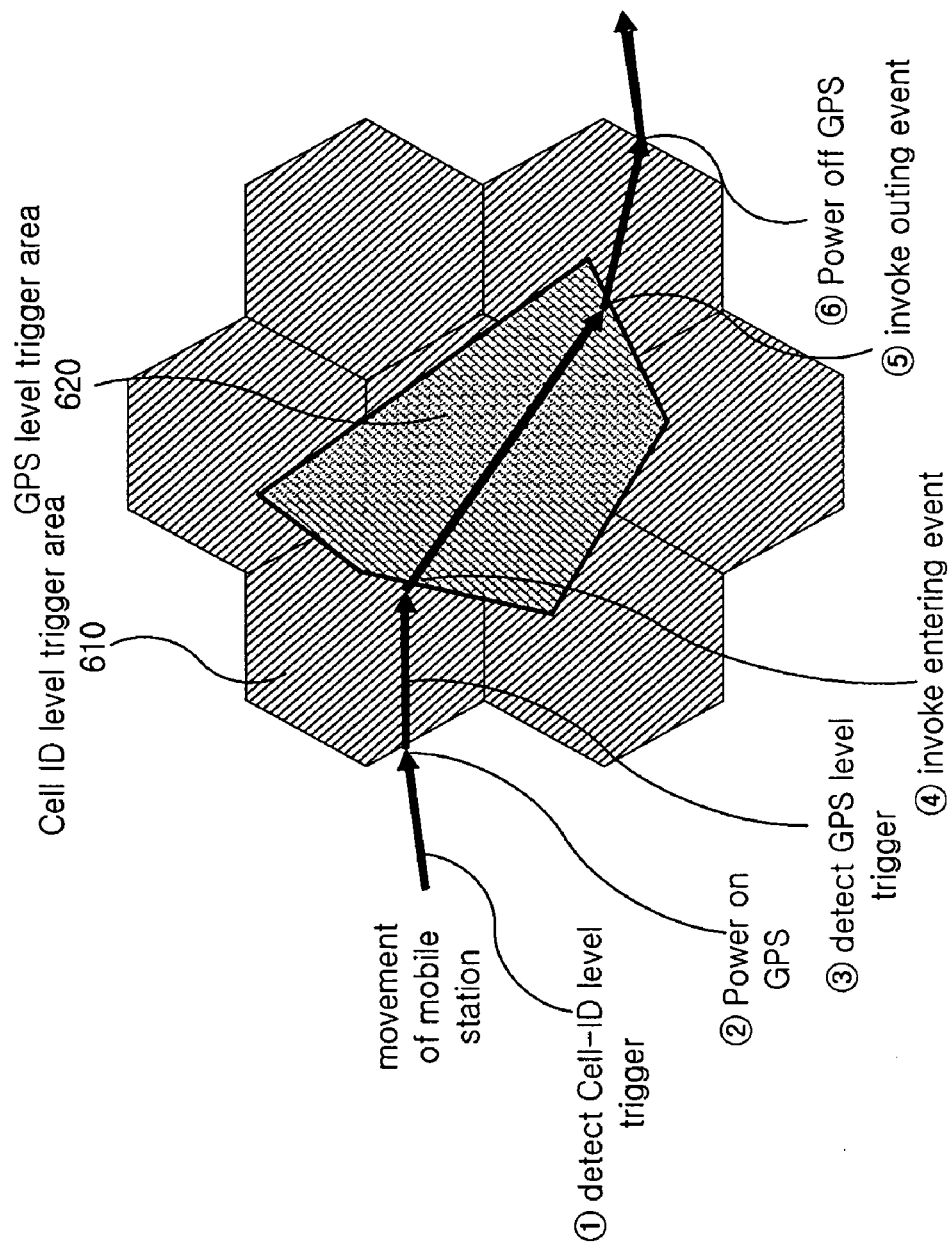
FIG. 6 shows an operational flow for handling a multi-level location trigger according to an embodiment of the present invention.

FIG. 6 shows an operational flow for handling a multi-level location trigger, and a detailed description related thereto is as follows.

In a conventional location trigger using Cell-IDs, location triggers are set in base station signal coverage areas, and it is difficult to set the location trigger in a relatively small area. An A-GPS embedded MS can be used for the location trigger in the small area, but location trigger detection using the A-GPS embedded MS may induce the PDE or the MS to be overloaded due to frequent polling.

Thus, the multi-level location trigger according to the embodiment of the present invention may be a method of activating a trigger using a device covering a smaller area.

In other words, in the case that a location trigger is set to a particular building or area in a particular cell, the LAT of the MS checks whether the MS enters the particular cell through a Cell-ID level location trigger and turns on the A-GPS when the MS enters the particular cell for precise location trigger detection.

Referring to FIG. 6, a process of the multi-level location trigger according to the embodiment of the present invention is as follows. When the MS leaves a Cell-ID level trigger area 610 and enters a GPS level trigger area 620, ① the Cell-ID level trigger detection is performed when the MS is about to enter a particular Cell-ID area, ② the GPS is turned on when the MS is about to enter the Cell-ID Level Trigger Area 610, ③ the A-GPS level trigger detection is performed, ④ a trigger area entering event is invoked, and ⑤ a trigger area outing event is invoked. Then, ⑥ the GPS is turned off when the MS leaves the particular Cell-ID area.

Therefore, the LAT of the MS checks whether the MS enters a particular cell area through the Cell-ID level location trigger, and turns on the A-GPS only when the MS enters the cell area for precise location detection.

To help in better understanding of the foregoing technology according to embodiments of the present invention, a structural aspect of the location trigger will be described in the following categories: (1) applications of location trigger service, (2) a structure of the location agent, and (3) a processor for a location trigger.

(1) Applications of Location Trigger Service

The location agent and LBSA 430 requesting the location trigger can be provided separately or together in the MS and the network. The applications of the location trigger service according to embodiments of the present invention are as shown in Table. 1.

TABLE 1

| | Location Agent | LBS Platform | Location Assistant | LBS Application |
|---|---|---|---|---|
| 1 | MS | Network | MS | MS |
| 2 | MS | Network | MS | Network |
| 3 | Network | Network | MS | MS |
| 4 | Network | Network | MS | Network |

Registering a location trigger by the LA embedded in the MS: the LBSA of the MS.

i.e.) alerting arrival in the subway and station, alerting of a dangerous area, etc.

Registering a location trigger by an LA embedded in the MS: an LBSA of the MS: an LBSA in the network.

i.e.) alerting of logistics and vehicle arrival, alerting of a dangerous area, etc.

Registering a location trigger by an LA in the network: an LP of the MS.

i.e.) alerting of a dangerous area, and a discount service area (a mobile coupon for a discount, or a phone bill discount), etc.

Registering a location trigger by an LA in the network: an LP in the network.

i.e.) child care, logistics, and vehicle monitoring, etc.

(2) Location Assistant—Based Structure

A location assistant-based structure according to an embodiment of the present invention is classified into four different levels respectively specifying location trigger ranges, as shown in Table. 2. A schematic description related thereto will be followed hereinafter, referring to FIGS. 7 to 10.

TABLE 2

| Level | Title | Supporting Content |
|---|---|---|
| Level 1 | Simple location trigger (LT) | request/response (i.e. HLR) |
| Level 2 | Timer LT | a time trigger (i.e. MLP-supportable MPC) |
| Level 3 | MS-Assisted LT | a simple event detection |
| Level 4 | MS-Based LT | a complex event and a triggering |

Figure 7:
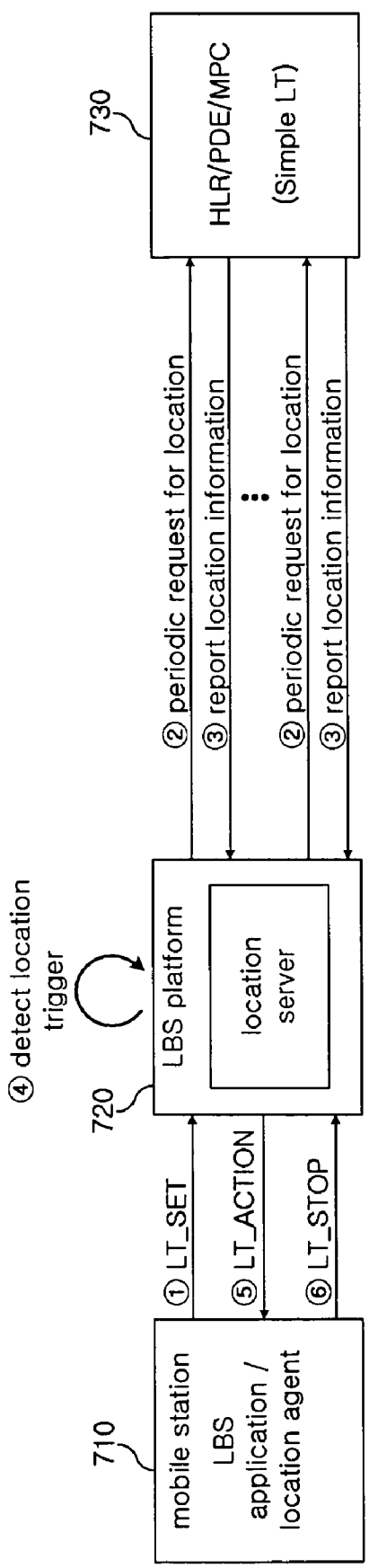
FIG. 7 shows a structure and an operational flow of a simple location trigger among LA structured configuring methods according to an embodiment of the present invention.
Figure 8:
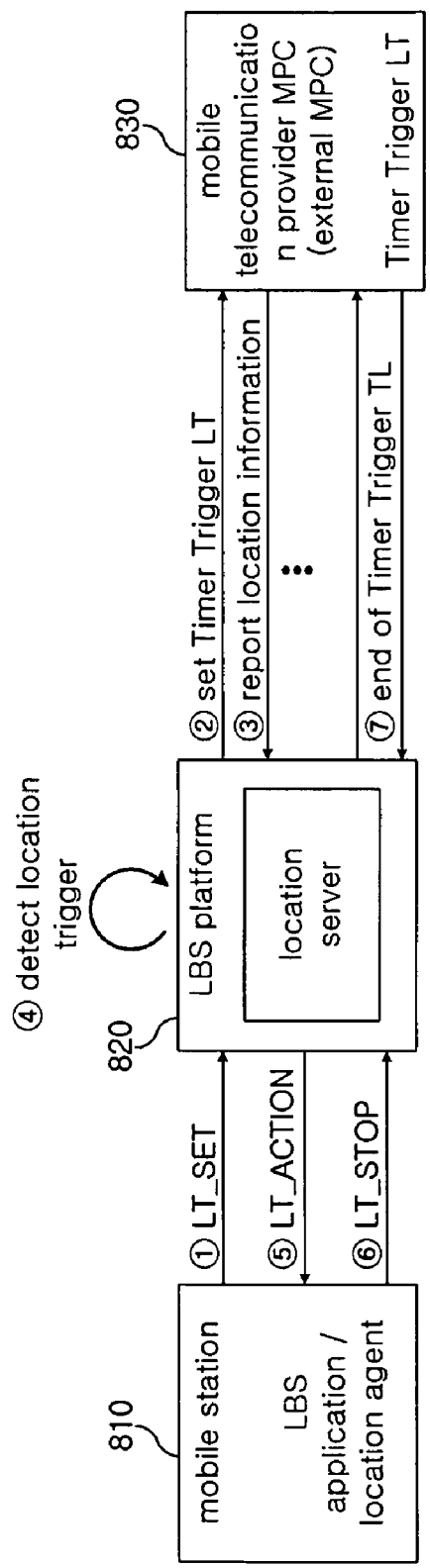
FIG. 8 shows a structure and an operational flow of a timer location trigger among LA structured configuring methods according to an embodiment of the present invention.
Figure 9:
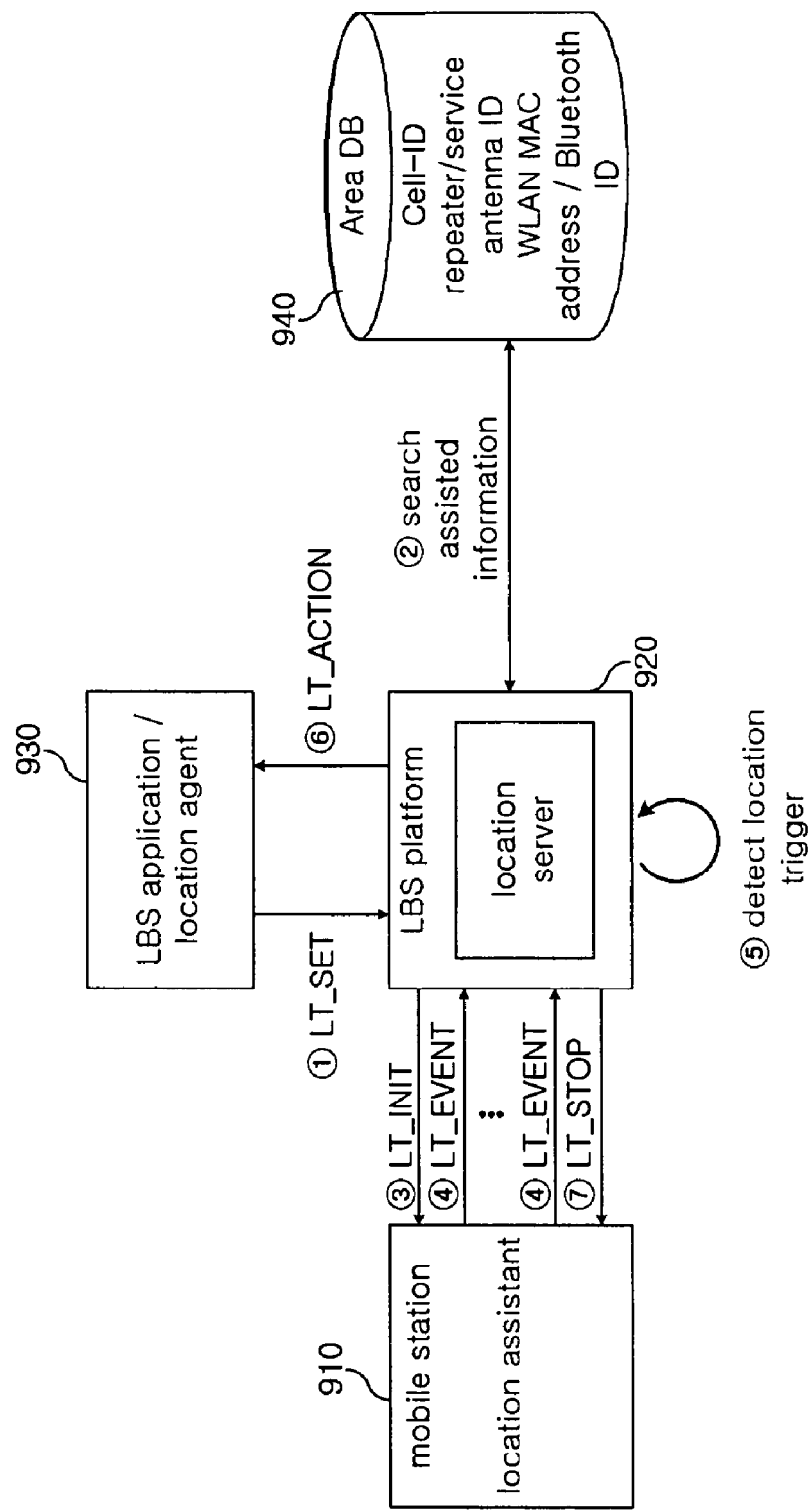
FIG. 9 shows a structure and an operational flow of an MS-Assisted trigger among LA structured configuring methods according to an embodiment of the present invention.
Figure 10:
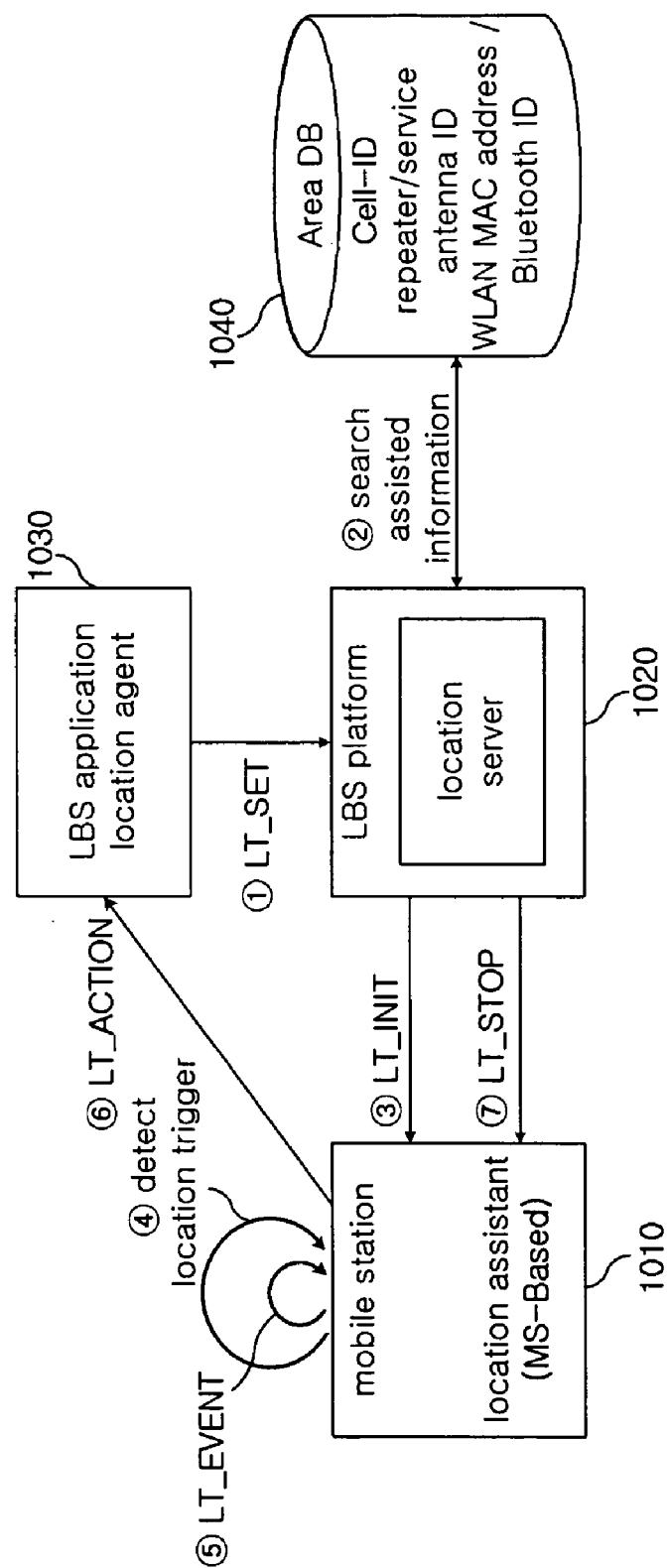
FIG. 10 shows a structure and an operational flow of an MS-Based trigger among LA structured configuring methods according to an embodiment of the present invention.

FIG. 7 shows an operational flow of a simple location trigger, FIG. 8 shows an operational flow of a timer location trigger, and FIG. 9 and FIG. 10 respectively show operational flows of MS-Assisted and MS-Based triggers.

Level 1: Simple LT

As shown in FIG. 7, a simple LT 730 does not have assisted functions for the location trigger according to the embodiment of the present invention, and simply returns location-based information in response to a location trigger request. Accordingly, the LP 720 continuously performs data polling.

In the case that a location data provider is one of HLR, PDE, and MPC 730 that do not support a periodic location trigger, a location server of the LP 720 periodically requests location-based information and the returned location information is checked to find out whether the reported location is included in a pre-specified location trigger area.

Level 2: Timer Location Trigger

As shown in FIG. 8, a timer LT 830 in the LAT-based structure according to the embodiment of the present invention periodically reports a current location of the MS. An LP 820 sets a time trigger once, and detects a location trigger using reported locations from the timer LT 830. In other words, location-based services are provided by an LP 820 of an LBS provider. In this case, an external MPC 830 is connected to the LP 820 and provides a periodic location information trigger.

Level 3: MS-Assisted LT

Referring to FIG. 9, an MS-Assisted LT 910 in the LAT-based structure according to the embodiment of the present invention detects simple events 15 including leaving and entering. A complex event is processed through an LP 920.

In other words, FIG. 9 exemplarily shows when LA and LBSA 930 are connected to a network while existing externally, and they are set to invoke an entering event or outing event when the MS enters or leaves a particular Cell-ID area.

Level 4: MS-Based LT

Referring to FIG. 10, an MS-Based LT1010 910 in the LAT-based structure according to the embodiment of the present invention independently performs the complex event and consequent actions, and is embedded in MSs 1010 that are capable of independent event detection and performance.

(3) Location Trigger Processor

Figure 11:
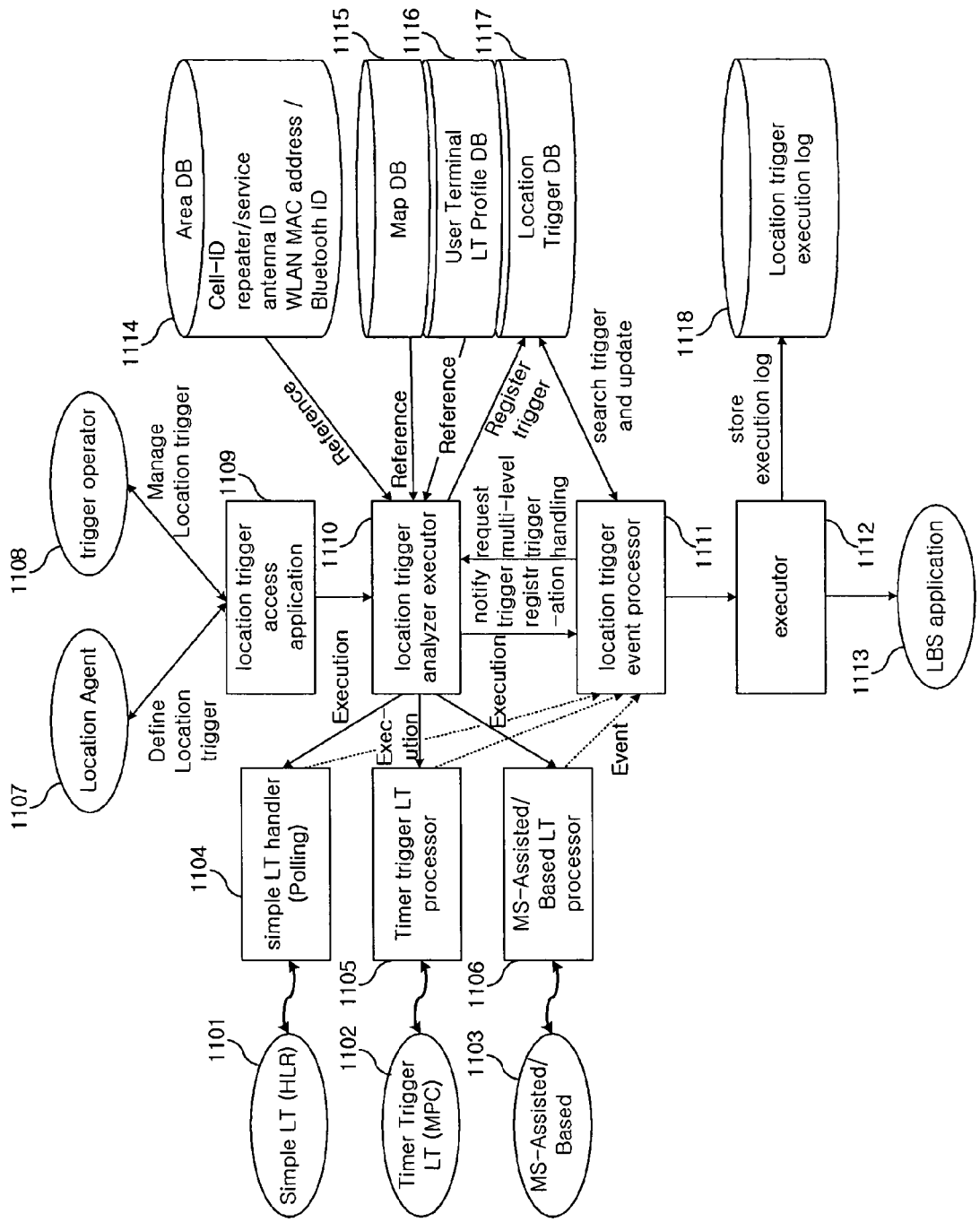
FIG. 11 shows a configuration diagram of a trigger processor for the location trigger according to an embodiment of the present invention.

FIG. 11 shows a configuration of a processor processing a location trigger according to an embodiment of the present invention. A location server of an LP 1113 includes a location trigger access application 1109, a location trigger analyzer 1110, a trigger processor, a location trigger event processor 1111, and an executor 1112. The trigger processor includes a simple LT processor 1104, a timer LT processor 1105, and an MS-Assisted/Based processor 1106.

Referring to FIG. 11, the location trigger access application 1109 of the location trigger processor according to the embodiment of the present invention is an application for the location trigger access inputted through an LP from a location agent 1107 or a trigger operator 1108.

The location trigger analyzer 1110 analyzes the location trigger using a Cell-ID Area DB and a Repeater Area DB 1114, and a Map DB 1115, and divides a complex location trigger into a multi-level trigger, as necessary. Further, the location trigger analyzer 1110 customizes a trigger in accordance with a characteristic of a trigger destination terminal and executes associated processors referring to a User Terminal-LT Profile DB 1116.

The simple LT processor 1104, the timer LT processor 1105, and the MS-Assisted/Based LT processor 1106 respectively access the trigger destination terminal directly, and respectively detect associated events. Herein, the events invoked from the processors 1104, 1105, and 1106 are asynchronously transmitted to the location trigger event processor 1111.

The location trigger event processor 1111 monitors the events transmitted from the respective processors and searches a location trigger DB 1117 until detecting an associated trigger event. Then the location trigger event processor 1111 executes the associated trigger event using the executor 1112.

The executor 1112 operates an LBSA 1113 by executing the event, and an operation result of the LBSA 1113 is recorded in a Location Trigger Operation Log DB 1118.

Four different services using the location trigger according to embodiments of the present invention are as follows.

(1) Safe Attending School/Company Alerting Service

1) Cell-ID Level Alarm Service

Figure 12:
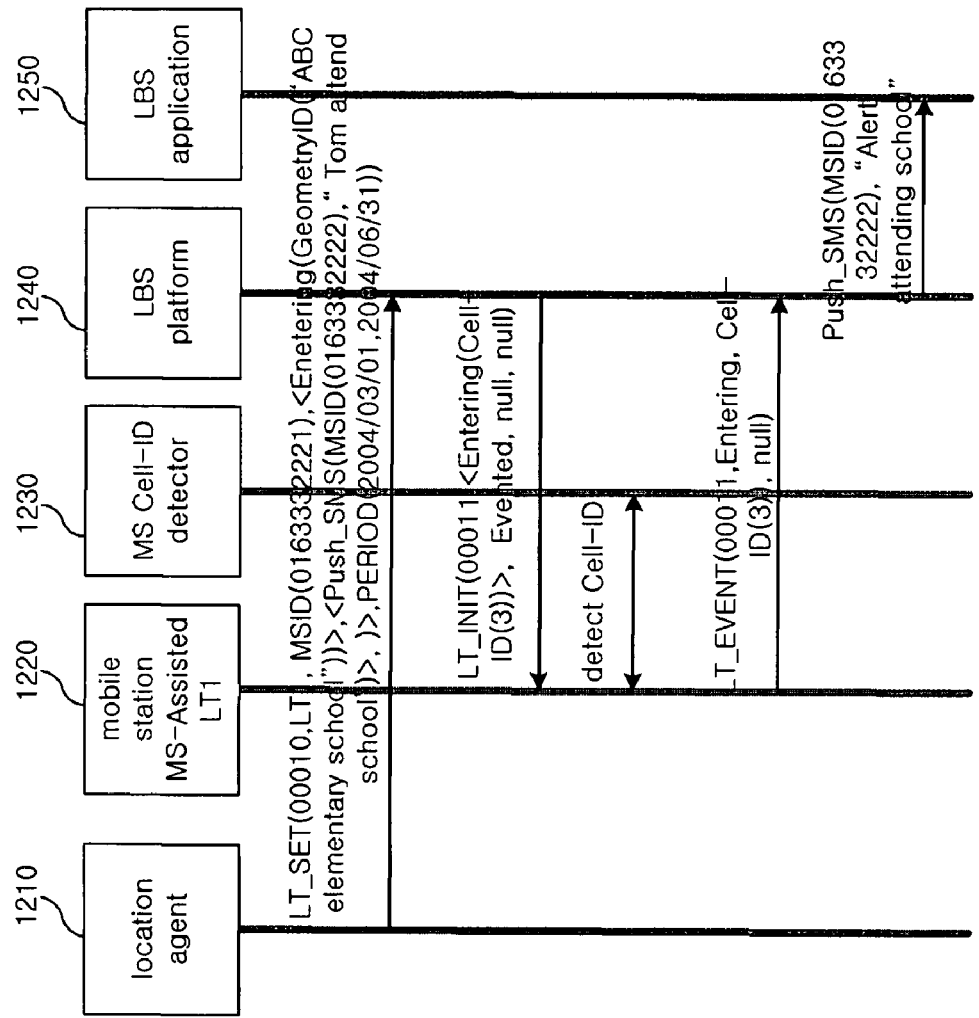
FIG. 12 exemplarily illustrates "Safe attending school/company alerting service protocol" according to an embodiment of the present invention.

FIG. 12 illustrates a "protocol of safe attendance alarm service" among the service according to the embodiment of the present invention using a Cell-ID level location trigger to provide safe attending school/company alarm service.

Referring to FIG. 12, an LA 1210 sets a GeometryID ("ABC elementary school") parameter of LT_SET, and the parameter is converted into Cell-ID(3) through the Cell-ID Area DB 1114 and the Map DB 1115 of the LBSA 1240 in FIG. 11. An LT_INIT message is sent to an MS-Assisted LT1 1220. Then, a Cell-ID detector 1230 detects the Cell-ID, and the MS-Assisted LT1 1220 sends an LT-EVENT message to the LP 1240 to invoke an associated event. The LP 1240 pushes an "attending school" or "attending company" message to the LBSA 1250 using an SMS. The safe attendance alarm service can be provided in a like manner.

2) Safe Attending Alarm Service using Cell-ID/A-GPS

Figure 13:
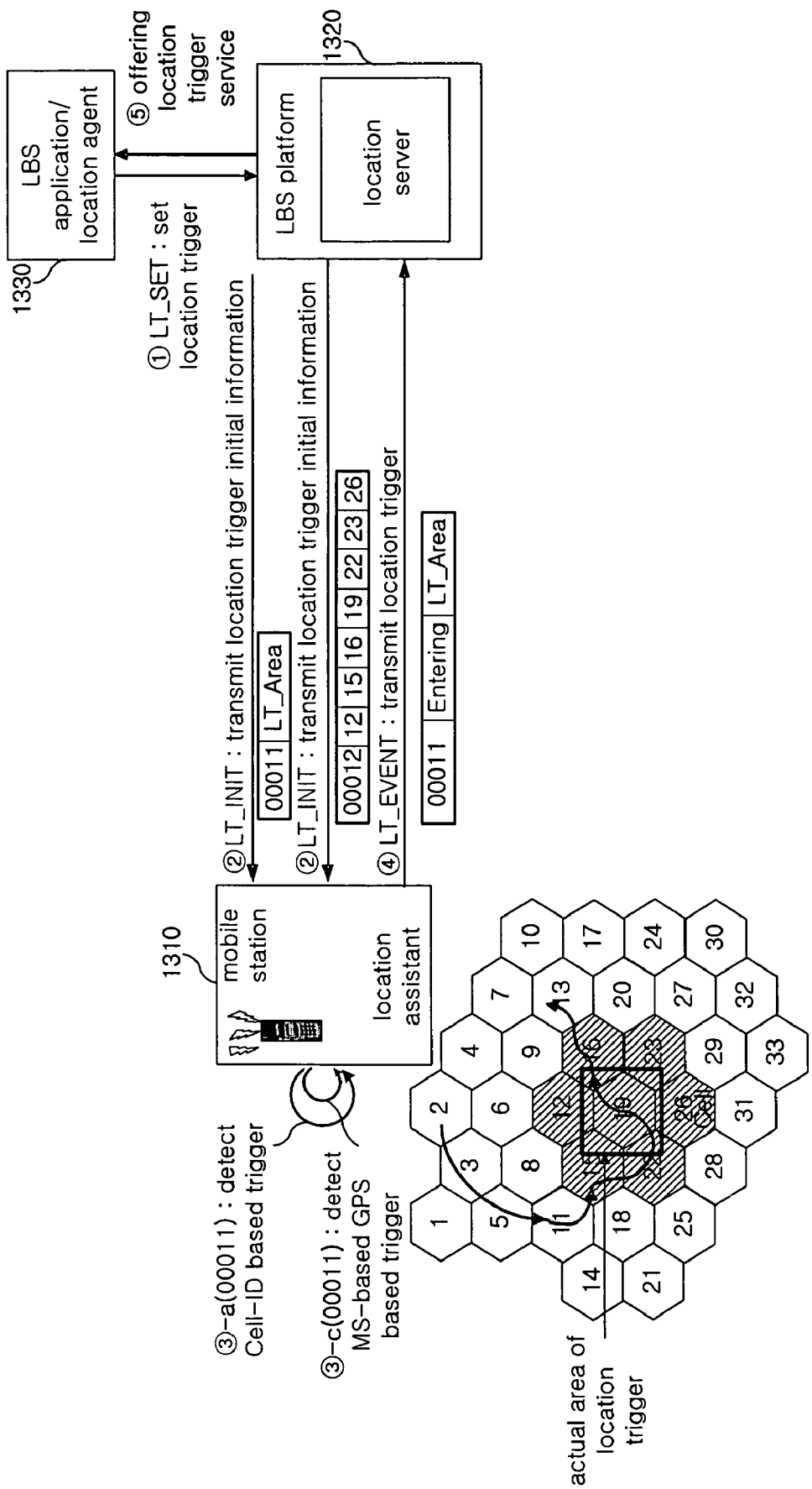
FIG. 13 exemplarily illustrates a multi-level location trigger execution for "Safe attending school alerting service using Base Station Cell-ID/A-GPS" according to an embodiment of the present invention.

FIG. 13 illustrates a multi-level location trigger for "safe attending school alarm service using Cell-ID/Assisted-GPS."

In a suburban area, a distance may exist between Cell-ID specified areas and thus potentially several kilometers therebetween are not included in any Cell-ID specified area. In this case, a multi-level trigger using A-GPS can provide a more precise location trigger.

For example, in the case of LT_SET ("00010", <MSID (0163332221)>, <ENTERING(GeometryID("ABC elementary school"))>, Push_SMS(<MSIS(0163332222), "John attends school"), PERIOD(2004/03/01, 2004/06/31). The message can be divided as follows.

① LT_INIT ("00011", MS-based GPS, <Entering(Polygon("x, y, . . . "))>, Triggered, null, null)

② LT_INIT("00012", Cell-ID, <Entering(<Cell-ID(3)>)>, Nothing, WageUp-Trigger(00201), null).

(2) Service Antenna or Repeater Identification-Based Alerting Service

Figure 14:
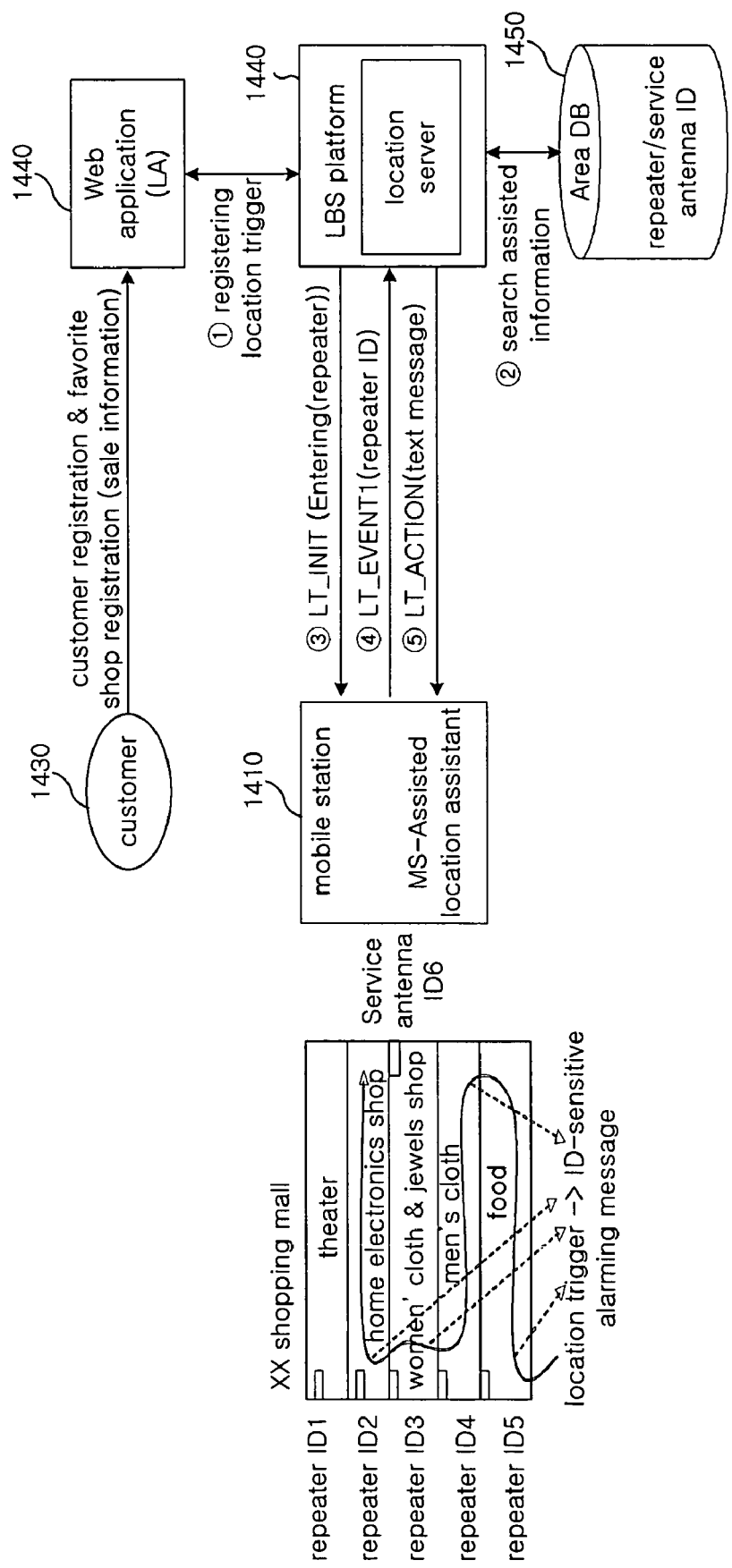
FIG. 14 exemplarily illustrates a location trigger execution for "Alerting service using repeater and service antenna IDs" according to an embodiment of the present invention.

FIG. 14 exemplarily illustrates a location trigger execution for "repeater ID/service antenna-based alerting service." The repeater ID or the service antenna ID can be used to provide a specific zone alerting service in a shopping mall or a theme park, etc.

Herein, more specific location triggers in the shopping mall and the like can be provided by controlling an output of the repeater or the service antenna and subdividing installation areas.

(3) Service of Alerting Outing from Area

Figure 15:
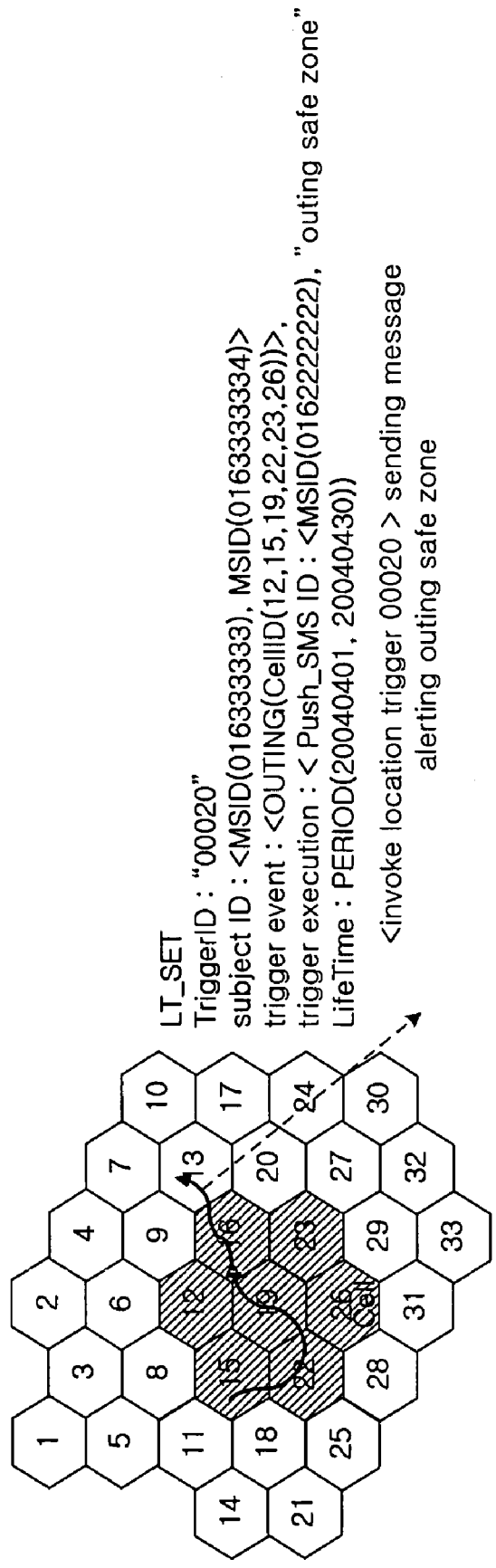
FIG. 15 exemplarily illustrates a location trigger execution for "Entering/outing alerting service" according to an embodiment of the present invention.

FIG. 15 exemplarily illustrates a location trigger execution for "service of alerting of outing from area." In this service, a particular safe area is pre-specified. Thus, when an MS leaves the particular safe area, an alerting message is sent to an operator or a terminal.

For example, a Cell-ID area for a child or a worker is pre-specified, and an alerting message is sent to the child or the worker when the child or the worker leaves the pre-specified area.

Further, this service may be applied in a shopping mall or a theme park where the service antenna and the repeater ID-based alerting service is applied as shown in FIG. 14. In this case, the outing from area alerting service may send a message for informing of purchased items or a next season for bargain sales, or send a message for polling consumer satisfaction.

(4) Location-Sensitive Mobile-Telephone Charge Discount Service

Figure 16:
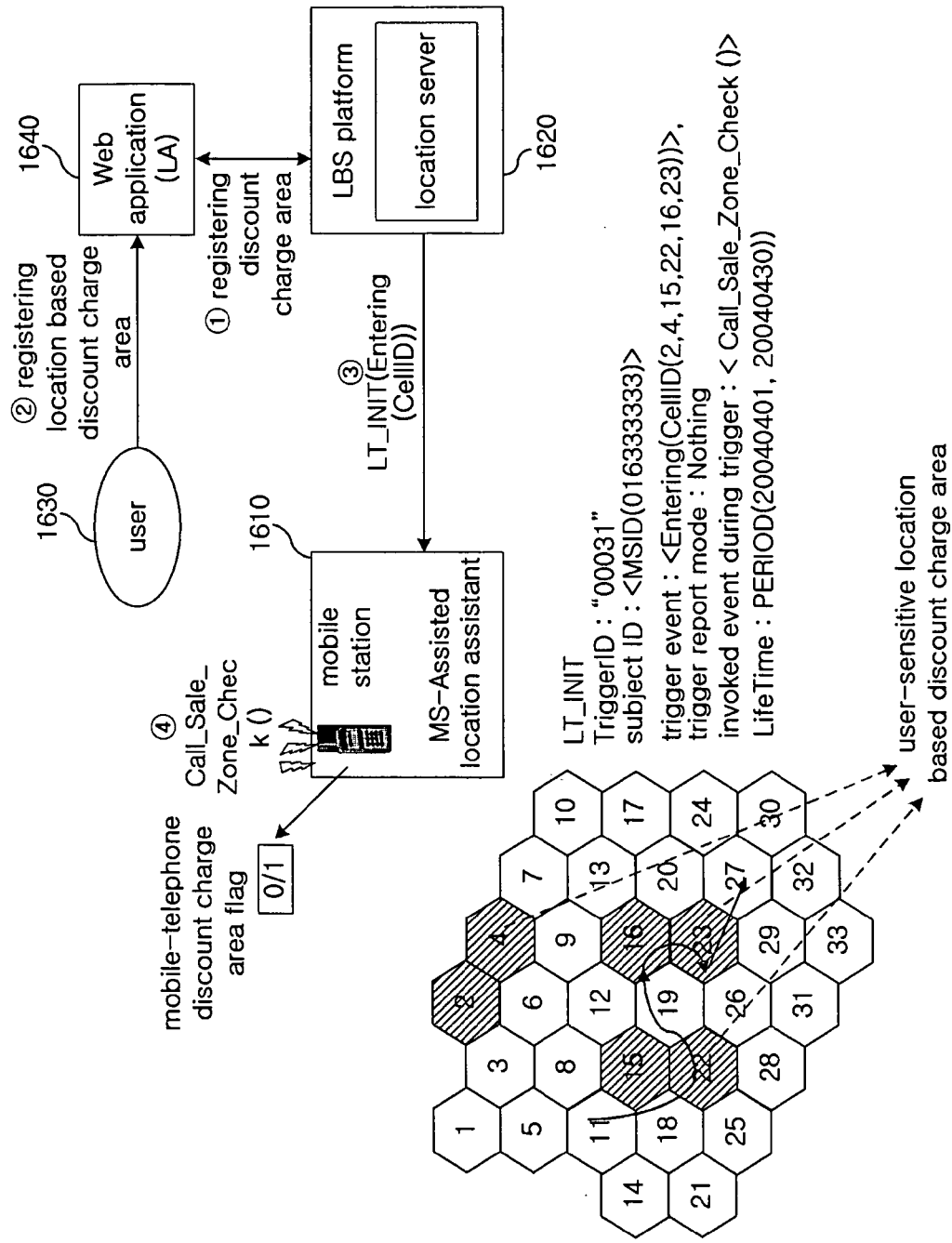
FIG. 16 and FIG. 17 exemplarily illustrate a location trigger execution for "Location sensitive mobile-telephone charge discount service" according to an embodiment of the present invention.
Figure 17:
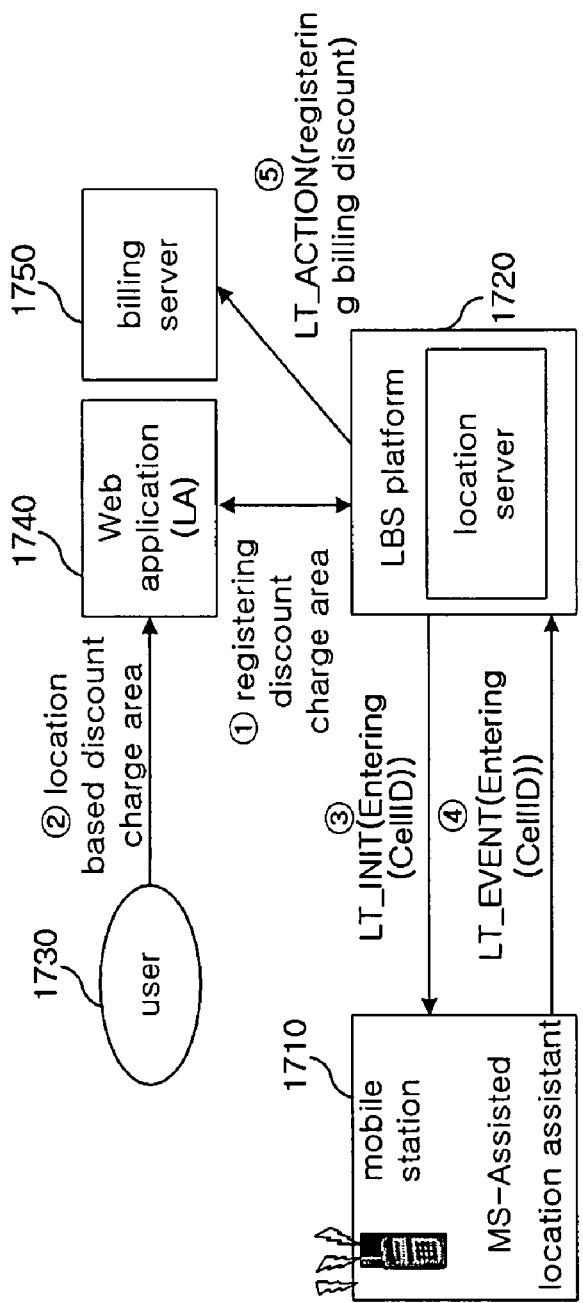

FIG. 16 and FIG. 17 exemplarily illustrate a location trigger execution for "location-sensitive mobile-telephone charge discount service." It offers a mobile-telephone charge discount service in a particular area using an MS-assisted LT. For example, the TTL Zone service provided by SK Telecom offers location-sensitive discounts to subscribers.

The use of the MS-Assisted LT enables a user customized mobile telephone charge discount service. For example, the TTL Zone service is limited to an area pre-specified by a mobile communication service provider, but the location-sensitive mobile-telephone charge discount service according to the embodiment of the present invention is available in base stations where users are predetermined and thus a special rate is offered to the predetermined users in the area by using the MS-Assisted LT.

FIG. 16 exemplarily illustrates an operational flow of the mobile-telephone charge discount service using a location trigger. As shown therein, a discount charge area flag is programmed in a safe memory of an MS, and a Call_Sale_Zone_Check() function is executed when the MS enters a trigger-specified Cell-ID Area. Herein, the function sets the discount charge area flag to 1, and the flag is set to 0 when the MS leaves the discount charge area and the Call_Sale_Zone_Check() function is terminated.

When the user wants to make a phone call or use wireless Internet, an application program checks whether the discount charge area flag is set to 1, and sends a call message or a request message including an identifier to identify discount charge areas when the flag is set to 1.

The mobile-telephone charge discount service can be provided without using the discount area flag as shown in FIG. 17. In this case, an entering event message is sent to an associated server when the MS enters a discount charge area, and the user is offered the discount service and pays a discounted mobile-telephone bill.

According to the embodiments of the present invention, trigger assisted information including a particular Cell-ID in a location trigger area is transmitted to an MS, and a location trigger is processed by events invoked on the bases of the information.

Further, particular area-based information (i.e., a Cell-ID and a BS area) is transmitted to an LAT in an MS from an LP, and the LAT compares BS Cell-IDs when a Cell-ID change event is invoked, monitors whether the MS enters or leaves the particular area, and transmits a monitoring result to the LP to push an SMS or to receive associated services.

In addition, Cell-ID and particular area identifiers may be saved in the LAT of the MS to process a location trigger in a rather smaller area than a big area (i.e., Cell). In this case, when the MS enters an associated base station and thus an entering event invocation is detected as previously described, the A-GPS is turned on to precisely monitor triggering in a particular area in the small area and to thereby transmit a resulting event to the LP to send a corresponding SMS message or offer location-based services.

According to a conventional method, the MSC/HLR extension or periodic polling method may induce direct extension of communication equipment including MSC or HLR, or excessive load and cost. However, these problems can be solved by extending the functionality of the MS according to the foregoing embodiments of the present invention.

In addition, the location trigger method according to the embodiments of the present invention can provide the following services: Safe Attending School/Company Alerting Service, Service Antenna or Repeater Identification-Based Alerting Service, Service of Alerting Exiting from Area, and Location-Sensitive Mobile-Telephone Charge Discount Service.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Accordingly, use of the multi-level MS-Assisted location trigger enables offering of various services, and solves problems of the conventional method such as direct extension of communication equipment including MSC or HLR, or excessive load and cost due to extension of MSC/HLR and periodical polling.

Further, by providing Safe Attending School/Company Alerting Service, Service Antenna or Repeater Identification-Based Alerting Service, Service of Alerting Exiting from Area, and Location-Sensitive Mobile-Telephone Charge Discount Service, the present invention utilizes the LBS and provides various services using a location trigger.

What is claimed is:

1. A location trigger system for a location-based service (LBS), comprising:
   a mobile station (MS) embedding a location assistant (LAT) for detecting a location trigger event, the MS detecting the location trigger event by comparing a location identifier of the MS with a list of location identifiers of interest;
   an LBS platform (LP) transmitting location trigger assisted information of a location trigger area to the MS, and processing the location trigger event received from the MS, the location trigger assisted information including the list of location identifiers of interest;
   a location agent (LA) setting the location trigger to obtain location information of the MS; and
   an LBS application (LBSA) connected to the LP, and receiving a customized LBS based on the location information of the MS in accordance with the location trigger,
   wherein the location trigger is processed distributedly by the MS and the LP.

2. The location trigger system according to claim 1, further comprising an area database (DB) storing location trigger assisted information of the location trigger area.

3. The location trigger system according to claim 2, wherein the location trigger assisted information of the location trigger area is at least one selected from a group including a Cell-ID, a repeater ID, a service antenna ID, a MAC address of a wireless LAN, and a Bluetooth ID.

4. The location trigger system according to claim 1, wherein the location trigger assisted information of the location trigger area includes at least one element of a group, the group including a Cell-ID, a repeater ID, a service antenna ID, a MAC address of a wireless LAN, and a Bluetooth ID.

5. The location trigger system according to claim 1, wherein the LP comprises a plurality of networked communication apparatuses for access to the location information of the MS.

6. The location trigger system according to claim 5, wherein the plurality of communication apparatuses comprise a Mobile Positioning Center (MPC), a Home Location Resister (HLR)/Mobile Switching Center (MSC)/Visitor Location Resister (VLR), and a Position Determination Entity (PDE).

7. The location trigger system according to claim 1, wherein the LA and the LBSA co-exist with the MS on a network, or are separately provided thereon.

8. The location trigger system according to claim 1, further comprising a location server installed on the LP, the location server obtaining the location trigger and a simplified location of the MS.

9. The location trigger system according to claim 8, wherein the location server comprises:
   a location trigger access application for accessing a location trigger inputted from a location agent or a trigger operator tool through the LP;
   a location trigger analyzer analyzing the location trigger, and dividing a complex location trigger into a multi-level location trigger;
   a trigger processor directly accessing a terminal to invoke a trigger, and detecting associated events;
   a location trigger event processor monitoring the events provided from the trigger processor, comparing the events to a location trigger DB, and detecting an associated trigger; and
   an executor executing the triggered events.

10. The location trigger system according to claim 9, wherein the trigger processor comprises a simple location trigger (LT) processor, a time trigger LT processor, an MS-Assisted LT processor, and an MS-Based LT processor.

11. A location trigger method for a Location-Based Service (LBS), comprising:
   (a) a location agent (LA) setting a location trigger;
   (b) an LBS platform (LP) transmitting initial information of the location trigger to a mobile station (MS);
   (c) the MS in which the LA is embedded detecting a location trigger event, the MS detecting the location trigger event by comparing a location identifier of the MS with a list of location identifiers of interest;
   (d) the MS transmitting information of the location trigger event to the LP, the location trigger event invoked based on the location trigger; and
   (e) the LP processing the location trigger according to the information of the location trigger event.

12. The location trigger method according to claim 11, further comprising providing an LBS application with a location-based service in accordance with the location trigger processed by the LP.

13. The location trigger method according to claim 11, wherein in b), the LP searches through a Cell-ID Area DB and transmits an associated Cell-ID to the MS.

14. The location trigger method according to claim 11, further comprising obtaining a radio signal including the MS Cell-ID, the repeater ID, the service antenna ID, the MAC address of a wireless LAN, and a Bluetooth ID, and invoking the location trigger event using a device covering a relatively smaller area when another device covering a relatively bigger area satisfactorily processes a trigger event.

15. The location trigger method according to claim 14, further comprising:
   setting the location trigger for a particular building or area within a particular cell;
   detecting whether the MS enters the particular cell through a Cell-ID level location trigger using the LAT embedded in the MS; and
   detecting a more precise location trigger by turning on an Assisted-GPS when the MS enters the particular cell.

16. The location trigger method according to claim 11, wherein the LAT and the LP use a plurality of messages to process the location trigger.

17. The location trigger method according to claim 16, wherein the plurality of messages comprise an LT setting message (LT-SET), an LT initialization message (LT_INIT), an LT event message (LT_EVENT), and an LT action message (LT_ACTION).

18. The location trigger method according to claim 11, wherein the LAT detects a simple event related to entering/exiting of the MS, and the LP performs a complex event, independently performing associated actions.

19. The location trigger method according to claim 11, wherein the MS is an MS-based terminal capable of independent performance of the complex event and the associated actions.

20. The location trigger method according to claim 11, wherein the LAT-embedded MS detects a Cell-ID level location trigger in c), and the location trigger method further comprises (f) an attending school and company alerting service, depending on a detection result.

21. The location trigger method according to claim 20, wherein (c) further comprises processing a more specific location trigger by turning on an A-GPS when the A-GPS embedded MS enters an area where a Cell-ID is pre-specified.

22. The location trigger method according to claim 11, wherein, in (b), the LP searches a particular area DB and transmits associated Cell-ID information to the MS, and the location trigger method further comprises (f) providing an alert message or an exiting alerting service performing a particular process when the MS leaves the particular area through the location trigger process.

23. A location-based service (LBS) service method using a location trigger, comprising:
  (a) a location agent (LA) setting a location trigger;
  (b) an LBS platform (LP) searching a particular area DB and transmitting a repeater ID or a service antenna ID to a mobile station (MS);
  (c) a location assistant (LAT) embedded in the MS for detecting a location trigger event, the MS detecting the location trigger event by comparing a location identifier of the MS with a list of location identifiers of interest;
  (d) the MS transmitting information of the repeater ID or the service antenna ID to the LP, the information obtained in consequence to the location trigger; and
  (e) the LP processing the location trigger event using the transmitted information and transmitting an associated short message service (SMS) to the MS.

24. The LBS method according to claim 23, wherein the LBS in (e) is a regional information alerting service using the repeater ID or the service antenna ID.

25. An LBS service method using a location trigger, comprising:
  (a) an LA registering a mobile-telephone charge discount area;
  (b) a user registering a particular mobile-telephone charge discount area with the LA;
  (c) an LP transmitting information on a Cell-ID in a particular trigger location to the LA;
  (d) setting a mobile-telephone charge discount area flag when an LAT embedded MS enters the particular mobile-telephone charge discount area;
  (e) the MS detecting a location trigger event and transmitting information of the location trigger event to the LP, the MS detecting the location trigger event by comparing a location identifier of the MS with a list of location identifiers of interest, the location trigger event invoked in accordance with the mobile-telephone charge discount area flag; and
  (f) the LP transmitting an SMS associated with the location trigger event invoked based on the mobile-telephone charge discount area flag to the MS.

26. The LBS method according to claim 25, wherein the LBS is a location-sensitive mobile-telephone charge discount service using the LAT of the MS and the flag.

27. The LBS method according to claim 26, wherein the LBS is the location-sensitive mobile-telephone charge discount service for generating an SMS in response to the information of the location trigger event and billing the MS when the MS enters a mobile-telephone charge discount area.

* * * * *